United States Patent [19]

Hoffsommer et al.

[11] 4,018,676

[45] Apr. 19, 1977

[54] REMOVAL OF EXPLOSIVE MATERIALS FROM WATER BY CHEMICAL INTERACTION ON STRONGLY BASIC ION EXCHANGE RESINS

[75] Inventors: John C. Hoffsommer; Lloyd A. Kaplan, both of Silver Spring; Donald A. Kubose, Olney; Donald J. Glover, Columbia, all of Md.

[73] Assignee: The United States of America as represented by the Secretary of the Navy, Washington, D.C.

[22] Filed: Jan. 15, 1976

[21] Appl. No.: 649,441

[52] U.S. Cl. .............................. 210/24; 149/109.6
[51] Int. Cl.² ................................. B01D 15/00
[58] Field of Search ............ 149/109.6; 210/24, 29, 210/37 R, 40

[56] References Cited

UNITED STATES PATENTS

| | | | |
|---|---|---|---|
| 2,647,084 | 7/1953 | McDonald | 210/54 R |
| 2,999,861 | 9/1961 | Fleck et al. | 210/24 |
| 3,099,529 | 7/1963 | Hatch et al. | 210/37 R |

*Primary Examiner*—Frank A. Spear, Jr.
*Assistant Examiner*—Ivars Cintins
*Attorney, Agent, or Firm*—R. S. Sciascia; A. L. Branning; P. J. Hagan

[57] ABSTRACT

Hydrolyzable, non-aromatic, nitroso- or nitro-substituted explosive compounds are removed from water by adsorption of the explosive on a strongly basic anion exchange resin, and by chemical interaction of the adsorbed explosive with the anion exchange resin to produce relatively non-toxic products.

5 Claims, No Drawings

REMOVAL OF EXPLOSIVE MATERIALS FROM WATER BY CHEMICAL INTERACTION ON STRONGLY BASIC ION EXCHANGE RESINS

BACKGROUND OF THE INVENTION

The present invention generally relates to the removal of explosive materials from water contaminated therewith by treament on an ion exchange resin, and more particularly to the removal of hydrolyzable, non-aromatic, nitroso- or nitro-substituted explosive compounds from water by adsorption of the explosive on a strongly basic anion exchange resin, and by chemical interaction of the adsorbed explosive with the anion exchange resin to produce non-toxic products.

Explosive materials, particularly nitroso- and nitro-substituted organic compounds, have been known for some time to be present as contaminants in the effluent waters of explosive manufacturing and disposal facilities. These contaminants represent a potential environmental hazard because the contaminated effluent may in turn contaminate the ground water, streams and rivers from which drinking water is obtained. The current concern with minimizing all sources of environmental pollution emphasizes the need for an effective method for removing explosive waste materials from water.

In the past, water contaminated with explosive material has been treated by passing it through beds of charcoal, or other adsorbent material. While the explosive is physically removed from the water in this manner, the disposal of large amounts of adsorbed explosive material still remains a problem. Solutions such as burning, detonation in a safe zone or dumping in the ocean give rise to further environmental pollution. Thus, a need exists for an effective method for the quantitative removal of explosive material from water which also solves the problem of disposing of the explosive material once it is removed from the water.

SUMMARY OF THE INVENTION

It is therefore an object of the present invention to provide a method for the removal of explosive materials from water contaminated therewith.

It is also an object of the present invention to provide an effective method for the disposal of the explosive materials which are removed from the water.

These objects as well as others which will become apparent in light of the following detailed description are accomplished by the steps of passing an aqueous solution containing a hydrolyzable, non-aromatic, nitroso- or nitro-substituted explosive compound, or mixture of said compounds through, and in contact with, a bed of a strongly basic anion exchange resin whereby the explosive compounds present in the aqueous solution are substantially removed from the aqueous solution and decomposed to non-toxic products by contact with the anion exchange resin.

DESCRIPTION OF THE INVENTION

According to the present invention it has been discovered that when an aqueous solution containing a hydrolyzable, non-aromatic, nitroso- or nitro-substituted explosive compound is brought into contact with a strongly basic anion exchange resin, the resin performs two functions in that, it removes substantially all of the explosive material from the aqueous solution containing it, and renders the explosive material harmless by decomposition to harmless products.

The method of the invention is generally applicable for the removal of contaminant explosive materials from aquous solutions containing detectable minor amounts of the explosive in amounts from about 0.001 ppm up to a saturated aqueous solution.

The method of the invention is generally suitable for removing any hydrolyzable, non-aromatic, nitroso- or nitro-substituted explosive compound, or mixture of said compounds, present in detectable quantities in an aqueous solution. While it is not desired to be bound by any particular theory, it is believed that the explosive compounds are adsorbed on the polymer backbone of the anion exchange resin and are thus subject to basic hydrolysis in the presence of the water in the aqueous solution and the hydroxyl ions associated with the anion exchange resin. The products of hydrolysis are non-toxic and may be disposed of readily.

The nitroso- or nitro-substitutents of the explosive compounds may be chemically bonded to oxygen, e.g., nitrites and nitrates, or to nitrogen, e.g., nitramines and nitrosamines. The nitroso or nitro group may also be chemically bonded to carbon in the explosive compound.

The method of the invention is particularly effective for the removal of hydrolyzable, non-aromatic nitramines, nitrite esters and nitrate esters from aqueous solutions containing such compounds.

Examples of hydrolyzable, non-aromatic, nitroso- or nitro-substituted explosive compounds which can be removed from water and disposed of according to the method of the presnt invention include cyclotrimethylenetrinitramine (RDX), cyclotetramethylenetetranitramine (HMX), pentaerythritol tetranitrate, nitroglycerine, ethylenedinitramine, nitrocellulose, pentaerythritol trinitrate, ethylene glycol dinitrate, glycerol monolactate trinitrate, and cyclotrimethylenetrinitrosamine. Other hydrolyzable, non-aromatic nitramines, nitrosamines, nitrite esters and nitrate esters may also be treated according to the method of the present invention.

The presence of such harmful compounds in the effluent waters of explosive manufacturing facilities has posed a serious disposal problem. By treating an aqueous solution containing any of the aforementioned explosive compounds according to the present method, the potentially harmful contaminants are removed from the water, hydrolyzed to non-toxic products, and the effluent from the resin bed may be disposed of readily.

The determination can be routinely made as to whether a particular contaminant may be effectively removed from water in accordance with the present method. The identification of particular compounds which are present as contaminants in water is typically done in the early stages of investigation. When a particular nitroso- or nitro-substituted compound is identified a large sample of the compound may be subjected to hydrolysis in a homogeneous solution of a strong base. If the compound is decomposed by hydrolysis it may be removed from water according to the present invention since virtually all compounds of the type described above which will undergo hydrolysis will be adsorbed on a strongly basic anion exchange resin.

Aromatic compounds cannot effectively be treated acccording to the present invention because they form complexes with the ion exchange resin which are not readily eluted. Thus, while the aromatic compounds may be removed from an aqueous solution such compounds are not decomposed, and the exchange resins on which they are adsorbed cannot be regenerated by ordinary methods.

The expression "strongly basic anion exchange resin" is used herein to signify those resins containing the quaternary ammonium moiety. Anion exchange resins containing tertiary or secondary ammonium moieties, while not as strongly basic, may be used, however, resins containing the quaternary ammonium moiety have been found to be most effective and are preferred. The resins may be activated in the usual manner by treatment wih an aqueous solution of an alkali metal or alkaline earth metal hydroxide.

Anion exchange resins employed in the present method include copolymers of styrene and divinylbenzene which are sold by the Rohm and Haas Co., Philadelphia, Pa., under the trade name Amberlite. Particularly suitable for use in the present invention are Amberlite IRA 400 and Amberlite IRA 410. Similar resins sold under the trade name Dowex may be substituted as may any other strongly basic anion exchange resin.

It has been determined by experimentation that one cubic foot of Amberlite IRA-400resin at an hydroxide loading of 1.28 pounds of hydroxide ion per 44 pounds of resin can remove 5.58 pounds of an explosive material such as RDX contained in 14,400 gallons of water saturated with RDX at 25° C (approx. 44 ppm RDX).

Certain advantages may be gained by substituting a modified ion-exchange resin for the Amberlite IRA-400resin. For example, the practical capacity of the adsorbent might be extended by using a resin with a lower chloride ion to hydroxide ion selectivity ratio. The selectivity ratio for Amberlite IRA-400is twenty-five. By using a resin in which the chloride ion to hydroxide ion selectivity ratio is approximately one, hydroxide ions would not be lost as readily from the resin by anionic displacement. This is particularly important since ground waters are known to contain various concentrations of dissolved salts.

The amount of anion exchange resin employed to treat the aqueous solution is dependent in part on the method of contact and the amount of explosive material present in the solution. Generally, amounts from about 0.04 to about 0.4 percent of resin based on the weight of the aqueous solution are satisfactory, although amounts from 0.1 to 0.2 by weight of aqueous solution are preferred.

Upon an examination of the effluent from the ion exchange resin during the treatment of an aqueous solution of RDX the following substances were identified: nitrous oxide ($N_2O$), ammonia and nitrogen, all of which are gases and are relatively harmless. Further analyses showed that nitrite ions and formaldehyde are retained on the anion exchange resin. Thus, it is evident that the anion exchange resin acts in a dual capacity in that it removes the explosive compounds from the water and chemically interacts with the explosive compounds to produce harmless products.

The following specific examples are given for the purpose of illustration. It is not intended to limit the scope of the invention to the details of the examples.

EXAMPLE I

An aqueous solution containing 44.0 ppm RDX was passed through 5.0 grams of the anion (OH—) form of Amerlite IRA-400at an average rate of 2.2 ml/min. The RDX content of the effluent remained less than 0.04 ppm RDX for the passage of 734 ml. of the RDX feed.

EXAMPLE II

In another experiment, an aqueous solution containing 1.97 ppm HMX was passed through 10.0 grams of the anion ($OH^-$) form of Amerlite 410 at an average rate of 1.2 ml/min. The HMX content of the effluent remained less than 0.01 ppm HMX for the passage of 27 liters of the HMX feed.

The spent resin may be completely regenerated by the passage of a 1 molar aqueous sodium chloride solution through the resin bed, followed by a 1 molar aqueous sodium hydroxide solution. In general, four resin volumes of each of the aqueous sodium cloride and sodium hydroxide solutions are required to regenerate the resin.

Obviously numerous modifications and variations of the present invention are possible in light of the above teachings. It is therefore to be understood that, within the scope of the appended claims, the invention may be practiced otherwise than as specifically described.

What is claimed as new and desired to be secured by Letters Patent of the United States is:

1. A method for the removal of a hydrolyzable, non-aromatic, nitroso- or nitro-substituted explosive compound, or mixture of said compounds from an aqueous solution containing said compound or mixture thereof which comprises passing said aqueous solution through, and in contact with, a bed of the hydroxyl form of a strongly basic anion exchange resin, whereby said compound or mixture thereof is substantially all removed from the aqueous solution and decomposed into non-toxic products.

2. The method of claim 1 wherein the explosive material is selected from the group consisting of nitramines, nitrosamines, nitrite esters and nitrate esters.

3. The method of claim 1 wherein the explosive material is selected from the group consisting of RDX, HMX, pentaerythritol tetranitrate, nitroglycerin, ethylenedinitramine, nitrocellulose, pentaerythritol trinitrate, ethylene glycol dinitrate, glycerol monolactate trinitrate, and cyclotrimethylenetrinitrosamine.

4. The method of claim 1 wherein the explosive material is selected from the group consisting of RDX and HMX.

5. A method for the removal of RDX from an aqueous solution containing it which comprises passing the aqueous solution of RDX through, and in contact with, a bed of the hydroxyl form of a strongly basic anion exchange resin, whereby the RDX is substantially all removed from the aqueous solution and is decomposed into non-toxic products.

* * * * *